A. A. & J. F. DARBY.
NUT LOCK.
APPLICATION FILED SEPT. 14, 1909.

955,054. Patented Apr. 12, 1910.

Witnesses
Wm Smith.
R. M. Smith.

Inventors
Averno A. Darby.
James F. Darby.
By Victor J. Evans
Attorney

UNITED STATES PATENT OFFICE.

AVERNO A. DARBY AND JAMES FRANK DARBY, OF VIDALIA, GEORGIA, ASSIGNORS, BY DIRECT AND MESNE ASSIGNMENTS, OF ONE-THIRD TO AVERNO A. DARBY, ONE-THIRD TO WARREN T. JENKINS, AND ONE-THIRD TO MOSES LEADER, ALL OF VIDALIA, GEORGIA.

NUT-LOCK.

955,054. Specification of Letters Patent. Patented Apr. 12, 1910.

Application filed September 14, 1909. Serial No. 517,634.

*To all whom it may concern:*

Be it known that we, AVERNO A. DARBY and JAMES F. DARBY, citizens of the United States, residing at Vidalia, in the county of Toombs and State of Georgia, have invented new and useful Improvements in Nut-Locks, of which the following is a specification.

This invention relates to nut locks, the object of the invention being to provide a simple, practical and reliable device of the character referred to in which the locking feature may be manipulated by hand and the construction of which will adapt the locking feature to be disconnected from the nut and bolt in a simple manner.

With the above and other objects in view, the nature of which will more fully appear as the description proceeds, the invention consists in the novel construction, combination and arrangement of parts as herein fully described, illustrated and claimed.

Figure 1:
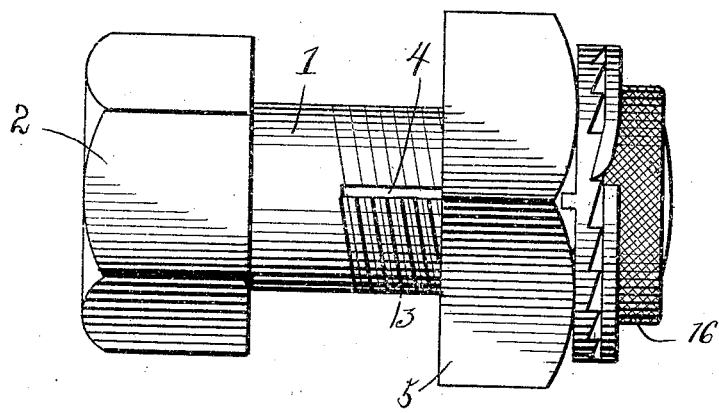
Figure 2:
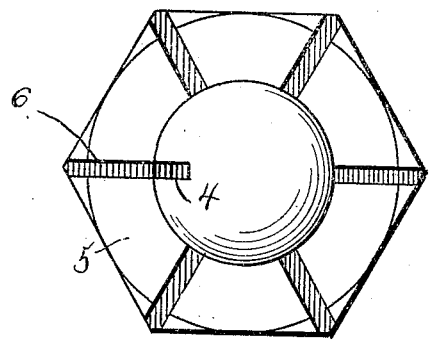
Figure 4:
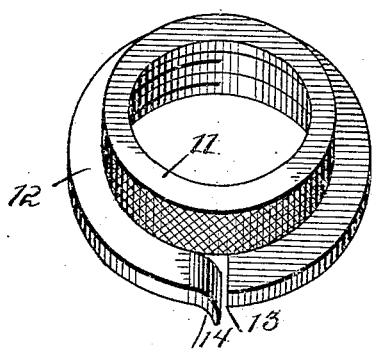
Figure 3:
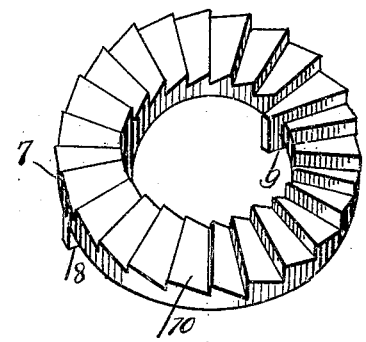

In the accompanying drawings:—Figure 1 is a plan view of a bolt and nut with the nut lock in its preferred form applied thereto. Fig. 2 is an outer face view of the nut, showing also the bolt in end view. Fig. 3 is a perspective view of the locking washer toward the outer face thereof. Fig. 4 is a similar view of the lock nut looking toward its outer face.

Referring to the drawings, 1 designates a bolt provided with the usual head 2 and threads 3, said bolt differing from the ordinary bolt only in that it is provided along one side with a longitudinal groove 4, the purpose of which will hereinafter appear.

5 designates the nut threaded on the bolt and which in carrying out the present invention in its preferred form is provided in the outer face thereof with a series of radial kerfs 6 extending from the outer margin of the nut to the inner bore thereof, as shown in Fig. 2, said kerfs being adapted to register one at a time with the grooves 4 in the bolt.

7 designates a locking washer adapted to fit over the end of the bolt and rest against the outer surface of the nut 5, said washer being provided on its inner face with diametrically opposite tongues 8 and 9 which extend radially with respect to the bolt and are adapted to simultaneously occupy opposite kerfs 6 in the nut. One of the tongues, as at 9 is extended well within the central opening of the locking washer, as shown in Fig. 3 and is preferably of a width equal to the extreme depth of the washer and is adapted to rest in the groove 4 of the bolt, the locking washer thus engages at one and the same time with the groove in the bolt and a kerf in the nut, thereby preventing the relative rotation between the nut and bolt.

The outer face of the locking washer is provided with ratchet teeth 10 and in connection therewith I employ a lock nut 11 adapted to be threaded upon the projecting end of the bolt 1 and provided at its inner side with a circumferential flange 12 which is radially divided as shown at 13 and bent down at one side of the dividing line to form a spring lip 14, which lip when the lock nut 11 is turned on the end of the bolt, snaps over the ratchet teeth 10 and finally stops in firm engagement with one of the teeth, thereby holding the locking washer close up against the nut so as to maintain the engagement between the tongues 8 and 9 and the kerfs 6 in the outer face of the nut. This prevents the nut from turning loose on the bolt in a practical and reliable manner.

The lock nut 11 is preferably milled or knurled around its periphery as shown at 16 to adapt the same to be more easily manipulated by hand. The lock nut may be removed by inserting an instrument along the spring lip 14 to thereby disengage said tongue from the teeth 10 which will enable the lock nut to be thrown off the bolt. The locking washer may subsequently be removed and then the nut may be thrown off the bolt.

We claim:—

In a nut lock, the combination of a bolt provided with a longitudinal groove along one side thereof, a nut threaded on said bolt and provided in its outer face with radial kerfs, a locking washer provided on its inner face with diametrically opposite tongues adapted to engage the kerfs in the nut, one of said tongues being also adapted to engage the groove in the bolt, ratchet teeth on the outer face of said locking washer, and a lock nut provided with a spring lip adapted to engage the ratchet teeth of the locking washer, substantially as and for the purpose described.

In testimony whereof we affix our signatures in presence of two witnesses.

AVERNO A. DARBY.
J. FRANK DARBY.

Witnesses:
JNO. N. PATRICK,
J. A. DEW.